(12) United States Patent
Heim

(10) Patent No.: US 8,794,674 B2
(45) Date of Patent: Aug. 5, 2014

(54) SECURITY ELEMENT AND METHOD FOR THE PRODUCTION THEREOF

(75) Inventor: Manfred Heim, Bad Tolz (DE)

(73) Assignee: Giesecke & Devrient GmbH, Munich (DE)

( * ) Notice: Subject to any disclaimer, the term of this patent is extended or adjusted under 35 U.S.C. 154(b) by 566 days.

(21) Appl. No.: 12/920,764

(22) PCT Filed: Feb. 17, 2009

(86) PCT No.: PCT/EP2009/001094
§ 371 (c)(1),
(2), (4) Date: Sep. 2, 2010

(87) PCT Pub. No.: WO2009/109291
PCT Pub. Date: Sep. 11, 2009

(65) Prior Publication Data
US 2011/0012337 A1    Jan. 20, 2011

(30) Foreign Application Priority Data
Mar. 7, 2008    (DE) .......................... 10 2008 013 167

(51) Int. Cl.
*B42D 15/00* (2006.01)

(52) U.S. Cl.
USPC ............................................. 283/91; 283/72

(58) Field of Classification Search
USPC ................................................... 283/72, 91
See application file for complete search history.

(56) References Cited

U.S. PATENT DOCUMENTS

| 3,858,977 A | 1/1975 | Baird et al. |
| 5,145,212 A | 9/1992 | Mallik |
| 5,319,475 A | 6/1994 | Kay et al. |
| 5,331,443 A | 7/1994 | Stanisci |
| 5,714,231 A | 2/1998 | Reinhart et al. |
| 5,882,463 A | 3/1999 | Tompkin et al. |
| 6,146,773 A | 11/2000 | Kaule |
| 6,761,959 B1 * | 7/2004 | Bonkowski et al. ............... 359/2 |
| 6,987,590 B2 * | 1/2006 | Phillips et al. ..................... 359/2 |
| 7,029,745 B2 | 4/2006 | Bonkowski et al. |
| 7,054,042 B2 * | 5/2006 | Holmes et al. .................... 359/2 |
| 7,667,894 B2 | 2/2010 | Hoffmuller |

(Continued)

FOREIGN PATENT DOCUMENTS

| CA | 2172113 A1 | 9/1996 |
| CA | 2163528 C | 12/1998 |

(Continued)

OTHER PUBLICATIONS

International Search Report, International Application No. PCT/EP2008/010742, 2 pages, Jul. 10, 2009.

(Continued)

*Primary Examiner* — Kyle Grabowski
(74) *Attorney, Agent, or Firm* — Lathrop & Gage LLP

(57) ABSTRACT

The present invention relates to a security element (20) for securing valuable articles, in which
a thin-film element (32) having a color-shift effect and a relief pattern (26) present in an embossing lacquer layer (24) are stacked,
the embossing lacquer layer (24) having the relief pattern (26) is metalized (28) in sub-regions, and
the relief pattern (26) of the partially metalized embossing lacquer layer (24, 28) is leveled with a transparent lacquer layer (30) whose refractive index substantially corresponds to the refractive index of the embossing lacquer layer (24).

37 Claims, 5 Drawing Sheets

(56) References Cited

U.S. PATENT DOCUMENTS

Figure 1:
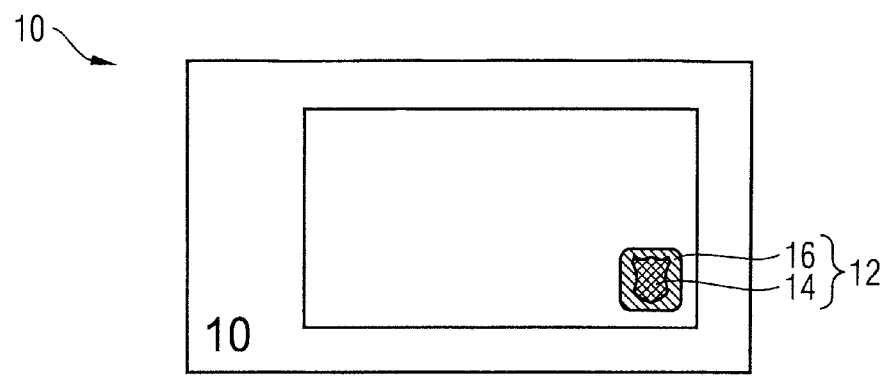

| | | | |
|---|---|---|---|
| 7,699,350 B2 * | 4/2010 | Heim | 283/91 |
| 7,728,931 B2 | 6/2010 | Hoffmuller | |
| 7,744,129 B2 * | 6/2010 | Heim | 283/72 |
| 7,808,605 B2 * | 10/2010 | Hoffmuller et al. | 283/91 |
| 7,986,459 B2 | 7/2011 | Kaule | |
| 8,083,894 B2 | 12/2011 | Gruszczynski | |
| 8,149,511 B2 | 4/2012 | Kaule | |
| 2002/0191234 A1 * | 12/2002 | Ishimoto et al. | 359/1 |
| 2003/0058491 A1 | 3/2003 | Holmes et al. | |
| 2005/0012326 A1 * | 1/2005 | Keller et al. | 283/94 |
| 2005/0104364 A1 * | 5/2005 | Keller et al. | 283/72 |
| 2005/0127663 A1 * | 6/2005 | Heim | 283/72 |
| 2005/0128543 A1 | 6/2005 | Phillips et al. | |
| 2005/0141094 A1 | 6/2005 | Wild et al. | |
| 2005/0151368 A1 * | 7/2005 | Heim | 283/72 |
| 2005/0168723 A1 | 8/2005 | Schilling et al. | |
| 2005/0180016 A1 | 8/2005 | Wild et al. | |
| 2006/0077496 A1 | 4/2006 | Argoitia et al. | |
| 2006/0134362 A1 | 6/2006 | Lu et al. | |
| 2006/0181077 A1 * | 8/2006 | Kaule et al. | 283/72 |
| 2007/0114787 A1 * | 5/2007 | Heim | 283/72 |
| 2007/0165182 A1 | 7/2007 | Hoffmuller et al. | |
| 2007/0211238 A1 | 9/2007 | Hoffmuller | |
| 2007/0211317 A1 * | 9/2007 | Heim | 359/2 |
| 2007/0216518 A1 | 9/2007 | Hoffmuller | |
| 2007/0229928 A1 | 10/2007 | Hoffmuller | |
| 2007/0241553 A1 * | 10/2007 | Heim et al. | 283/91 |
| 2007/0246933 A1 | 10/2007 | Heim et al. | |
| 2007/0273142 A1 | 11/2007 | Tompkin et al. | |
| 2007/0274559 A1 | 11/2007 | Depta | |
| 2008/0014378 A1 | 1/2008 | Hoffmuller | |
| 2008/0054621 A1 | 3/2008 | Burchard | |
| 2008/0079257 A1 | 4/2008 | Fessl | |
| 2008/0088859 A1 | 4/2008 | Depta | |
| 2008/0160226 A1 | 7/2008 | Kaule | |
| 2008/0163994 A1 | 7/2008 | Hoppe | |
| 2008/0198468 A1 | 8/2008 | Kaule | |
| 2008/0216976 A1 | 9/2008 | Ruck | |
| 2008/0250954 A1 | 10/2008 | Depta | |
| 2008/0258456 A1 | 10/2008 | Rahm | |
| 2009/0001709 A1 | 1/2009 | Kretschmar | |
| 2009/0008923 A1 | 1/2009 | Kaule | |
| 2009/0008926 A1 | 1/2009 | Depta | |
| 2009/0102605 A1 | 4/2009 | Kaule | |
| 2009/0115185 A1 | 5/2009 | Hoffmuller et al. | |
| 2009/0236061 A1 | 9/2009 | Gruszczynski | |
| 2009/0297805 A1 | 12/2009 | Dichtl | |
| 2009/0322071 A1 | 12/2009 | Dichtl | |
| 2010/0175843 A1 | 7/2010 | Gregarek | |
| 2010/0177094 A1 | 7/2010 | Kaule | |
| 2010/0182221 A1 | 7/2010 | Kaule | |
| 2010/0194091 A1 | 8/2010 | Heim | |
| 2010/0194532 A1 | 8/2010 | Kaule | |
| 2010/0196587 A1 | 8/2010 | Keller | |
| 2010/0207376 A1 | 8/2010 | Heim | |
| 2010/0208036 A1 | 8/2010 | Kaule | |
| 2010/0307705 A1 | 12/2010 | Rahm | |
| 2010/0308570 A1 | 12/2010 | Heim | |
| 2010/0320742 A1 | 12/2010 | Hoffmuller | |
| 2011/0007374 A1 | 1/2011 | Heim | |
| 2011/0012337 A1 | 1/2011 | Heim | |
| 2011/0027538 A1 | 2/2011 | Hoffmann | |
| 2011/0045248 A1 | 2/2011 | Hoffmuller | |
| 2011/0069360 A1 | 3/2011 | Dichtl | |
| 2011/0079997 A1 | 4/2011 | Heim | |
| 2011/0091665 A1 | 4/2011 | Heim | |
| 2011/0095518 A1 | 4/2011 | Hoffmuller | |
| 2011/0101670 A1 | 5/2011 | Heim | |
| 2011/0109078 A1 | 5/2011 | Hoffmuller | |
| 2011/0114733 A1 | 5/2011 | Heim | |
| 2011/0157183 A1 | 6/2011 | Kaule | |
| 2012/0126525 A1 | 5/2012 | Dorfler | |
| 2012/0168515 A1 | 7/2012 | Schutzmann | |
| 2012/0170124 A1 | 7/2012 | Fuhse | |

FOREIGN PATENT DOCUMENTS

| | | |
|---|---|---|
| CN | 1976816 A | 6/2007 |
| DE | 102004039355 A1 | 2/2006 |
| DE | 102004051919 A1 | 4/2006 |
| DE | 102006015023 A1 | 10/2007 |
| EP | 1 003 126 A2 | 5/2000 |
| EP | 1182055 A2 | 2/2002 |
| EP | 1 203 968 A1 | 5/2002 |
| EP | 1 047 549 B1 | 3/2003 |
| EP | 0 733 919 B1 | 9/2003 |
| EP | 0 911 758 B1 | 11/2005 |
| EP | 1 628 147 A1 | 2/2006 |
| EP | 1 715 392 A1 | 10/2006 |
| EP | 1 503 907 B1 | 1/2007 |
| JP | 2003326876 A | 11/2003 |
| JP | 2008083599 A | 4/2008 |
| RU | 2149763 C1 | 5/2000 |
| WO | WO 94/25288 A1 | 11/1994 |
| WO | WO 01/03945 A1 | 1/2001 |
| WO | WO 01/03945 A1 | 1/2001 |
| WO | WO 01/53113 A1 | 7/2001 |
| WO | WO 01/53113 A1 | 7/2001 |
| WO | WO 02/00445 A1 | 1/2002 |
| WO | WO 02/00445 A1 | 1/2002 |
| WO | WO 02/00446 A1 | 1/2002 |
| WO | WO 03/095227 A1 | 11/2003 |
| WO | WO 03/095228 A1 | 11/2003 |
| WO | WO 03/095657 A2 | 11/2003 |
| WO | WO 2005/034048 A1 | 4/2005 |
| WO | WO 2005/038136 A1 | 4/2005 |
| WO | WO 2005/105474 A2 | 11/2005 |
| WO | WO 2005/105475 A1 | 11/2005 |
| WO | WO 2005/108108 A2 | 11/2005 |
| WO | WO 2005105473 | 11/2005 |
| WO | WO 2005105474 | 11/2005 |
| WO | WO 2005105475 | 11/2005 |
| WO | WO 2005108106 | 11/2005 |
| WO | WO 2005108108 | 11/2005 |
| WO | WO 2005108110 | 11/2005 |
| WO | WO 2006/002756 A2 | 1/2006 |
| WO | WO2006002756 * | 1/2006 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006/040069 A1 | 4/2006 |
| WO | WO 2006/040069 A1 | 4/2006 |
| WO | WO 2006040069 | 4/2006 |
| WO | WO 2006056342 | 6/2006 |
| WO | WO 2006072380 | 7/2006 |
| WO | WO 2006087138 | 8/2006 |
| WO | WO 2006099971 | 9/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007/051529 A1 | 5/2007 |
| WO | WO 2007076952 | 7/2007 |
| WO | WO 2007079851 | 7/2007 |
| WO | WO 2007115648 | 10/2007 |
| WO | WO 2007/138293 A2 | 12/2007 |
| WO | WO 2008/000350 | 1/2008 |
| WO | WO 2008/000351 | 1/2008 |
| WO | WO 2008/049533 | 5/2008 |
| WO | WO 2008/061636 | 5/2008 |
| WO | WO 2008/071325 | 6/2008 |
| WO | WO 2009/000527 | 12/2008 |
| WO | WO 2009/000528 | 12/2008 |
| WO | WO 2009/000529 | 12/2008 |
| WO | WO 2009/000530 | 12/2008 |
| WO | WO 2009/012893 | 1/2009 |
| WO | WO 2009/024265 | 2/2009 |
| WO | WO 2009/080262 | 7/2009 |
| WO | WO 2009/080263 | 7/2009 |
| WO | WO 2009/083146 | 7/2009 |
| WO | WO 2009/083151 | 7/2009 |
| WO | WO 2009/100831 | 8/2009 |
| WO | WO 2009/100869 | 8/2009 |

(56) References Cited

FOREIGN PATENT DOCUMENTS

| WO | WO 2009/109291 | 9/2009 |
|---|---|---|
| WO | WO 2009/121578 | 10/2009 |
| WO | WO 2009/149831 | 12/2009 |
| WO | WO 2009/149833 | 12/2009 |
| WO | WO 2009/156079 | 12/2009 |
| WO | WO 2010/000470 | 1/2010 |
| WO | WO 2010/003646 | 1/2010 |
| WO | WO 2010/028739 | 3/2010 |
| WO | WO 2011/012281 | 2/2011 |
| WO | WO 2011/032665 | 3/2011 |
| WO | WO 2011/032671 | 3/2011 |

OTHER PUBLICATIONS

International Preliminary Report on Patentability, International Application No. PCT/EP2008/010742, 6 pages, Aug. 3, 2010, English Translation.
International Search Report, International Application No. PCT/EP2008/010740, 3 pages, Apr. 23, 2009.
International Preliminary Report on Patentability, International Application No. PCT/EP2008/010740, 6 pages, Nov. 22, 2010, English Translation.
International Search Report, International Application No. PCT/EP2009/000686, 2 pages, Sep. 18, 2009.
International Preliminary Report on Patentability, International Application No. PCT/EP2009/000686, 6 pages, Sep. 7, 2010, English Translation.
International Search Report, International Application No. PCT/EP2009/001094, 2 pages, Jul. 10, 2009.
International Preliminary Report on Patentability, International Application No. PCT/EP2009/001094, 9 pages, Nov. 2, 2010.
Saechtling-Zebrowski (1967), "Kunststoff-Taschenbuch", Carl Hansen, Munchen, S. 414 (German).
Saechtling-Zebrowski (1967), "Plastic Pocket", Carl Hansen, Munchen, S. 414 (Machine Translation).
Galiatsatos (2007), "Refractive Index, Stress-Optical Coefficient, and Optical Configuration Parameter of Polymers", Physical Properties of Polymers Handbook $2^{nd}$ Ed, Mark Ed., Chapter 50, pp. 823-840.

\* cited by examiner

SECURITY ELEMENT AND METHOD FOR THE PRODUCTION THEREOF

CROSS-REFERENCE TO RELATED APPLICATIONS

This application is the U.S. National Stage of International Application No. PCT/EP2009/001094, filed Feb. 17, 2009, which claims the benefit of German Patent Application DE 10 2008 013 167.9, filed Mar. 7, 2008, both of which are hereby incorporated by reference to the extent not inconsistent with the disclosure herewith.

The present invention relates to a security element for securing valuable articles, a method for manufacturing such a security element, as well as a security paper and a data carrier having such a security element.

For protection, data carriers, such as value or identification documents, but also other valuable articles, such as branded articles, are often provided with security elements that permit the authenticity of the data carrier to be verified, and that simultaneously serve as protection against unauthorized reproduction. Such security elements can be developed, for example, in the form of a security thread embedded in a banknote, a cover foil for a banknote having a hole, an applied security strip, a self-supporting transfer element, or also in the form of a feature region that is applied directly to a value document.

Security elements that display viewing-angle-dependent visual effects play a special role in safeguarding authenticity, as these cannot be reproduced even with the most modern copiers. For this, the security elements are furnished with optically variable elements that, from different viewing angles, convey to the viewer a different image impression and, depending on the viewing angle, display, for example, another color or brightness impression and/or another graphic motif.

In this connection, it is known to use security elements having multilayer thin-film elements whose color impression for the viewer changes with the viewing angle, and when the security feature is tilted, shifts for example from green to blue, from blue to magenta or from magenta to green. The occurrence of such color changes upon tilting a security element is referred to in the following as a color-shift effect.

Based on that, it is the object of the present invention to further improve a security element of the kind cited above, and especially to create a security element having an attractive visual appearance and high counterfeit security.

This object is solved by the security element having the features of the main claim. A method for manufacturing such a security element, a security paper and a data carrier are specified in the coordinated claims. Developments of the present invention are the subject of the dependent claims.

According to the present invention, in a security element of the kind cited above,
- a thin-film element having a color-shift effect and a relief pattern present in an embossing lacquer layer are stacked,
- the embossing lacquer layer having the relief pattern is metalized in sub-regions, and
- the relief pattern of the partially metalized embossing lacquer layer is leveled with a transparent lacquer layer whose refractive index substantially corresponds to the refractive index of the embossing lacquer layer.

Here, the present invention is based on the idea of avoiding a reciprocal visual influencing of the color-shift effect of the thin-film element and of the optically variable effect of the relief pattern in that the optical effect of the relief pattern is neutralized by a suitably formed transparent lacquer layer in the regions in which only the color-shift effect of the thin-film element is to be visible. The color-shift effect of the thin-film element and the optically variable effect of the relief pattern are then each visible having their specific color effect without reciprocal influencing. At the same time, the color-shifting regions and the relief pattern regions appear for the viewer to lie next to each other in perfect register without it being necessary to arrange the thin-film element itself in register with the relief patterns, as explained in greater detail below.

To level the relief pattern, the transparent lacquer layer is preferably applied in a layer thickness of more than 800 nm, especially of more than 1,000 nm. The difference in the refractive indices of the embossing lacquer layer and the transparent lacquer layer is preferably less than 0.3, particularly preferably even less than 0.1. To systematically modify the color impression of the thin-film element, the transparent lacquer layer can also be transparently colored. The transparent lacquer layer is preferably formed to be coilable and tack free.

Depending on the structure of the foil element, the transparent lacquer layer furthermore, expediently simultaneously, adheres well to the embossing lacquer, a reflector layer and a dielectric spacing layer or an absorber layer of the thin-film element. In this way, it is ensured that a thin-film structure composed of a hologram and an interference pattern, for example on a banknote, is circulation-durable against mechanical actions. A good adhesion of the layer composite also reduces its chemical vulnerability. To further increase the stability against chemical attacks, additionally, the lacquer is particularly preferably subsequently only poorly soluble in aqueous or solvent-containing liquids.

The relief pattern of the embossing lacquer layer can constitute a diffractive pattern, such as a hologram, a holographic grating image or a hologram-like diffraction pattern, or also an achromatic pattern, such as a matte pattern having a non-colored, silvery-matte appearance, a micromirror arrangement, a blazed lattice having a sawtooth-like groove profile or a Fresnel lens arrangement. The dimensions of the pattern elements of the diffractive relief patterns are usually on the order of the wavelength of light, so normally between 300 nm and 1 µm. Some relief patterns exhibit also smaller pattern elements, such as subwavelength gratings or moth-eye patterns whose pattern elements can also be smaller than 100 nm. In some cases, the pattern elements of achromatic microrelief patterns are also larger than 1 µm, the dimensions of micromirrors or blazed lattice lines range, for example, up to a height of about 15 µm and a lateral dimension of about 30 µm.

In an advantageous variant of the present invention, the thin-film element exhibits a reflection layer, an absorber layer and a dielectric spacing layer arranged between the reflection layer and the absorber layer. In such thin-film elements, the color-shift effect is based on viewing-angle-dependent interference effects caused by multiple reflections in the different sub-layers of the element. The path difference of the light reflected at the different layers depends, on one hand, on the optical thickness of the dielectric spacing layer, which determines the distance between the absorber layer and the reflection layer, and on the other hand, it varies with the respective viewing angle.

Since the path difference is on the order of the wavelength of visible light, due to destructive interference and amplification of certain wavelengths, an angle-dependent color impression results for the viewer. Through suitable choice of material and thickness of the dielectric spacing layer, a number of different color-shift effects can be designed, for example tilt effects, in which the color impression changes with the viewing angle from green to blue, from blue to magenta or from magenta to green.

In an advantageous variant of the present invention, the thin-film element is arranged over the partially metalized embossing lacquer layer and the transparent lacquer layer in the layer sequence absorber layer, dielectric spacing layer and reflection layer. Alternatively, also the partially metalized embossing lacquer layer and the transparent lacquer layer can be arranged over a thin-film element of the layer sequence reflection layer, dielectric spacing layer and absorber layer. The last-mentioned layer structure is suitable especially for security elements that are to be viewed from the top, while the first-mentioned layer structure is suitable especially for security elements that are to be viewed from the bottom, in other words the reverse of a substrate foil.

In all embodiments, the dielectric spacing layer is preferably produced through a vacuum vapor deposition process. Alternatively, the spacing layer can also be formed by a printing layer or by an ultrathin foil, especially a stretched polyester foil. Presently, an embodiment in which the dielectric spacing layer is formed by a low-index dielectric layer, especially a vapor-deposited $SiO_2$ layer or an $MgF_2$ layer, is particularly preferred.

Further details on the structure of such thin-film elements and on the materials and layer thicknesses that are usable for the reflection layer, the dielectric spacing layer and the absorber layer can be found in publication WO 01/03945, the disclosure of which is incorporated herein by reference.

The metalization of the embossing lacquer layer can advantageously be provided with gaps in the form of patterns, characters or codes that reveal the view of the thin-film element and thus create, within the metalization, negative information regions having a contrasting color effect. The thin-film element, too, can exhibit a reflection layer having gaps in the form of patterns, characters or codes that form transparent or translucent regions in the thin-film element. Through a combination of gaps in the metalization of the embossing lacquer layer with congruent gaps at least in the reflection layer of the thin-film element, transparent or translucent see-through regions can also be produced within the metalized relief regions.

In an advantageous development of the present invention, the security element is provided, in some regions, with a transparent phase-delay layer that forms a phase-shifting layer for light from the visible wavelength range. Phase-delay layers, which in the context of this description are sometimes also called phase-shifting layers, are optically active layers that act on the phase of a transmitted light wave. Here, due to differing refractive indices, the sub-beams of an incident polarized light wave acquire an optical path difference and thus a phase difference. If the phase difference of the two sub-beams is precisely a half or quarter wavelength, then so-called $\lambda/2$ or $\lambda/4$ layers are obtained.

In a further advantageous embodiment of the present invention, in some regions, a semi-transparent ink layer is arranged over the thin-film element, the color impression of the thin-film element being coordinated with the color impression of at least a sub-region of the semi-transparent ink layer when viewed under predetermined viewing conditions.

In a spectral range in which the color impression of the thin-film element is coordinated with the color impression of the semi-transparent layer, the semi-transparent ink layer preferably exhibits a transmittance between 30% and 95%, preferably between 60% and 95%, and quite particularly preferably between 80% and 95%.

The semi-transparent ink layer can be applied in different ways, advantageously it is imprinted, for example in a screen printing, intaglio printing, flexographic printing or other suitable printing process. Here, the semi-transparent ink layer can be imprinted directly on the thin-film element, but there can also be provided between the ink layer and the thin-film element transparent intermediate layers that act, for example, as a protective layer or adhesive layer. Such transparent intermediate layers can be provided also between the ink layer and the above-mentioned phase-delay layer.

To introduce additional features into the security element, in preferred embodiments, the semi-transparent ink layer is present in the form of characters, patterns or codes. This also includes embodiments in which the ink layer exhibits gaps in the form of characters, patterns or codes.

In particularly preferred embodiments, the semi-transparent ink layer is chosen such that it substantially preserves the polarization state of light from the visible wavelength range passing through. In this way, the patterns, characters or codes formed by the phase-delay layer can be made equally visible in both the color-variable and the color-constant regions, as explained in greater detail below.

Preferably, the security element is a security thread, a security band, a security strip, a patch or a label for application to a security paper, value document or the like. It is understood that the security element can also exhibit further layers, such as protective layers or additional effect layers having other security features.

The present invention also includes a method for manufacturing a security element of the kind described, in which a thin-film element having a color-shift effect and a relief pattern present in an embossing lacquer layer are stacked on a substrate, the embossing lacquer layer having the relief pattern is metalized in sub-regions, and the relief pattern of the partially metalized embossing lacquer layer is leveled with a transparent lacquer layer whose refractive index substantially corresponds to the refractive index of the embossing lacquer layer.

Here, in an advantageous method variant, first, a thin-film element is applied to the substrate in the layer sequence reflection layer, dielectric spacing layer and absorber layer, the embossing lacquer layer is applied over the thin-film element, embossed and partially metalized, and the partially metalized embossing lacquer layer is then leveled with the transparent lacquer layer.

According to another, likewise advantageous method variant, first, the embossing lacquer layer is applied to the substrate, embossed and partially metalized, the partially metalized embossing lacquer layer is leveled with the transparent lacquer layer, and a thin-film element is then applied to the transparent lacquer layer in the layer sequence absorber layer, dielectric spacing layer and reflection layer.

A further advantageous method variant consists in that the thin-film element having a color-shift effect is applied to a first substrate foil, in that the embossing lacquer layer is applied to a second substrate foil, embossed and partially metalized, and in that the thin-film element and the partially metalized embossing lacquer layer are then joined by means of an adhesive layer.

In all embodiments, after the transfer of the security element to a data carrier, the substrate foils can be removed, for example by means of a release layer arranged between the substrate foil and the remaining layer structure.

In an advantageous method variant, a semi-transparent ink layer is arranged over some regions of the thin-film element, the color impression of the thin-film element being coordinated with the color impression of at least a sub-region of the semi-transparent ink layer when viewed under predetermined viewing conditions. Here, the semi-transparent ink layer is advantageously imprinted, especially in the screen printing, intaglio printing, or flexographic printing process.

In a further advantageous method variant, the security element is provided with a transparent phase-delay layer that forms a phase-shifting layer for light from the visible wavelength range. Also the phase-delay layer can advantageously be imprinted on the thin-film element. Alternatively, the phase-delay layer can be applied to a separate substrate foil and transferred to the remaining layer structure.

The present invention further comprises a security paper having a security element of the kind described, as well as a data carrier that is furnished with such a security element. The data carrier can especially be a banknote, a value document, a passport, a certificate or an identification card. The described security elements, security papers or data carriers can especially be used for securing objects of any kind.

Further exemplary embodiments and advantages of the present invention are explained below by reference to the drawings, in which a depiction to scale and proportion was omitted in order to improve their clarity.

Figure 2:
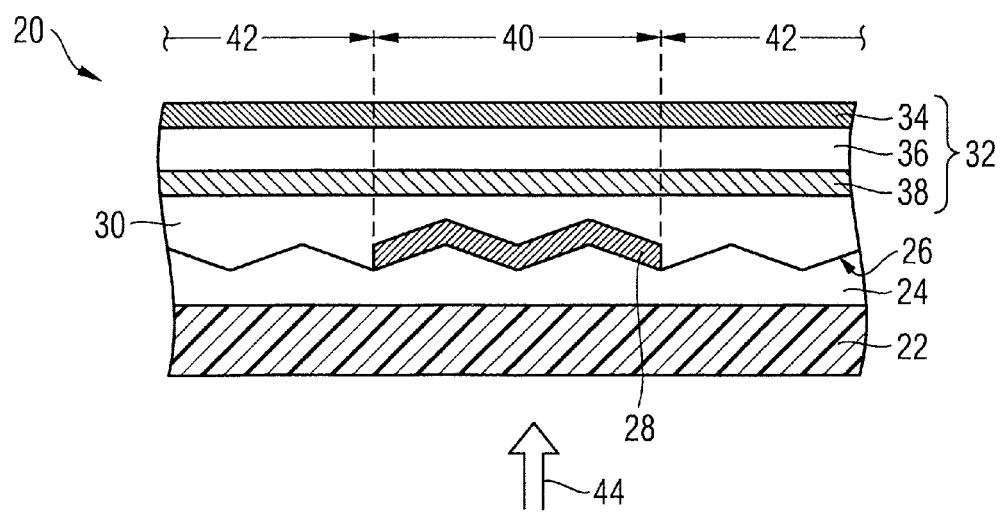
Figure 3:
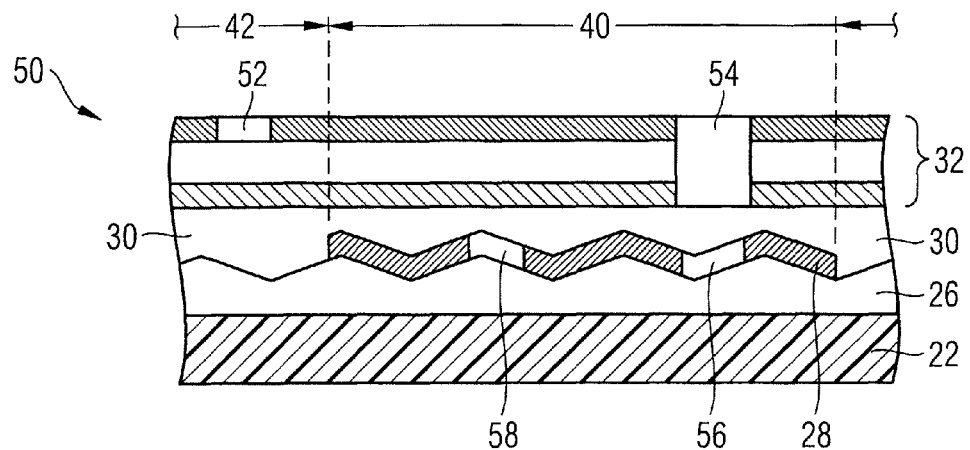
Figure 4:
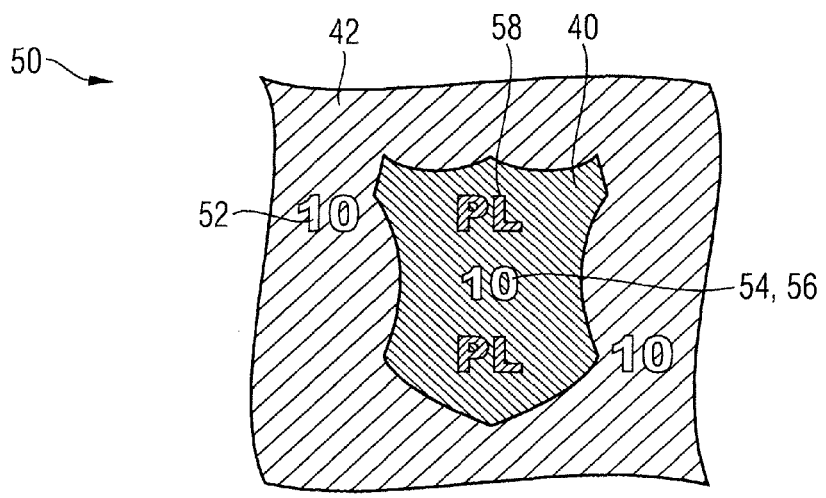
Figure 5:
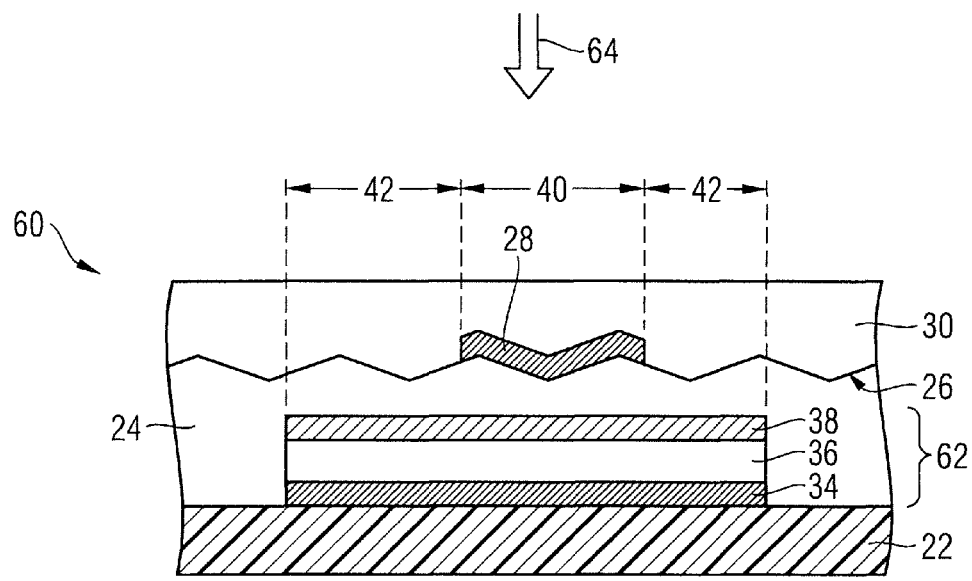
Figure 6:
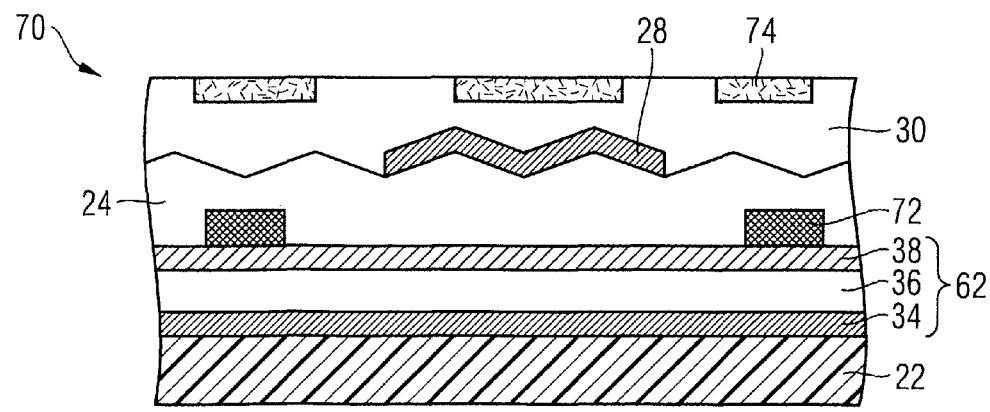

Shown are:

FIG. 1 a schematic diagram of a banknote having a security element according to the present invention, FIG. 2 a cross section through a security element according to an exemplary embodiment of the present invention, FIG. 3 a cross section through a security element according to a further exemplary embodiment of the present invention, FIG. 4 schematically, the visual impression of the security element in FIG. 3, in top view, FIG. 5 a cross section through a security element according to a further exemplary embodiment of the present invention, FIG. 6 a security element according to the present invention, having a semi-transparent ink layer that is applied in some regions, and a hidden security feature, and FIGS. 7 to 10 further exemplary embodiments of security elements according to the present invention.

The invention will now be explained using a banknote as an example. For this, FIG. 1 shows a schematic diagram of a banknote 10 having an inventive security element 12 in the form of an affixed transfer element. The security element 12 includes a hologram 14 and a color-shifting region 16 that, for the viewer, lie next to each other in perfect register and without reciprocally disrupting the visual impression.

It is understood that the present invention is not limited to transfer elements and banknotes, but can be used in all types of security elements, for example in labels on goods and packaging or in securing documents, identity cards, passports, credit cards, health cards and the like. In banknotes and similar documents, besides transfer elements, for example also security threads, and in addition to top-view elements, given a suitable design of the thin-film element, also see-through elements may be used.

The structure of security elements according to the present invention will now be explained with reference to FIGS. 2 to 6, the principle of the present invention first being described based on the schematic cross section in FIG. 2. The security element 20 in FIG. 2 includes a substrate foil 22, for example a PET foil, to which a UV-curing embossing lacquer layer 24 is applied. The embossing lacquer layer 24 was provided in an embossing step with a relief pattern 26 that depicts, for example, a desired hologram motif. In other embodiments, the relief pattern 26 can also constitute a holographic grating image, a hologram-like diffraction pattern or also an achromatic micropattern having a non-colored, for example silvery-matte, appearance.

When the finished security element is viewed, the hologram of the relief pattern 26 is visible only in a predetermined sub-region 40 in which the embossing lacquer layer 24 was provided, after the embossing, with a metalization 28. As the metalization 28, an opaque aluminum layer, for example, can be vapor deposited. It is understood that the position of the predetermined sub-region 40 is normally already taken into account when designing and embossing the relief pattern 26.

Further, the relief pattern 26 of the partially metalized embossing lacquer layer 24 is leveled with a transparent lacquer layer 30 whose refractive index substantially corresponds to the refractive index of the embossing lacquer layer 24. For this, the transparent lacquer layer 30 is applied to the embossing lacquer layer 24 in a layer thickness of several 100 nm, preferably of 1 µm or more. Moreover, the refractive indices of the transparent lacquer layer 30 and of the embossing lacquer layer 24 are coordinated with one another in such a way that the optically variable effect of the relief pattern 26 is substantially eliminated in the regions 42 outside the metalized sub-regions 40 in which the transparent lacquer layer 30 lies directly over the embossing lacquer layer 24. This is achieved in the exemplary embodiment in that the transparent lacquer layer 30 and the embossing lacquer layer 24 exhibit refractive indices that differ by less than 0.1.

Finally, over the relief pattern 26 leveled by the transparent lacquer layer 30 is arranged, having a color-shift effect, a thin-film element 32 that comprises a partially transparent absorber layer 38 composed of chrome, a vapor deposited dielectric $SiO_2$ spacing layer 36 and a reflection layer 34 formed by an opaque aluminum layer. As explained above, the color-shift effect of such a thin-film element 32 is based on interference effects caused by multiple reflections in the different sub-layers 34, 36, 38 of the element.

Due to the coordination of its refractive index with the embossing lacquer layer 24, and due to the leveling of the relief pattern 26, the transparent lacquer layer 30 now has, for one thing, the effect that the relief pattern produces, in the non-metalized regions 42, substantially no optically variable effect that is visible for the viewer. Furthermore, it mediates the adhesion between the embossing lacquer layer 24 and the color-shifting thin-film element 32.

In contrast, when viewed from a viewing direction 44, the optically variable effect of the relief pattern 26 appears in the sub-regions 40 uninfluenced by the lacquer layer 30 due to the metalization 28. Also, the opaque metalization 28 of the sub-regions 40 prevents the color-shift effect of the thin-film element 32 from being able to be perceived there from the viewing direction 44.

Thus, overall, in the metalized sub-regions 40, only the optically variable effect of the hologram formed by the relief pattern 26 is visible from the viewing direction 44. In the non-metalized sub-regions 42, the optical effect of the relief pattern 26 is neutralized by the transparent lacquer layer 30, only the color-shift effect of the thin-film element 32 appears there. Thus, for the viewer, the color-shift effect of the thin-film element 32 and the optically variable effect of the relief pattern 26 are each visible having their specific color effect without reciprocal influencing.

At the same time, the color-shifting regions 42 and the optically variable hologram regions 40 appear for the viewer to lie next to each other in perfect register without the thin-film element 32 itself having to be arranged in register with the relief patterns 26. Rather, the register and the lacking reciprocal influencing immediately result from the described arrangement and development of the thin-film element 32, the partially metalized embossing lacquer layer 24, 28 and the transparent lacquer layer 30 of the security element 20.

In the exemplary embodiment, the transparent lacquer layer 30 is formed to be coilable and tack free. It can also be transparently colored to systematically influence the optical appearance of the color-shift effect of the thin-film element 32.

After application of the security element 20 to a desired data carrier, the substrate foil 22 can remain there as part of the security element, or it can be removed, for example via a suitable release or separation layer. The thin-film element 32 and the partially metalized embossing lacquer layer 24, 28 can also first be manufactured separately on different substrate foils and then joined together by means of a suitable adhesive layer. Also in this case, one or both substrate foils can be removed in a subsequent method step.

In the exemplary embodiment 50 shown in FIGS. 3 and 4, in addition to the elements already described in connection with FIG. 2, gaps 52, 54, 56 and 58 are provided in the thin-film element 32 or the metalization 28 of the embossing lacquer layer 24. The gaps 52, 54, 56 and 58 form patterns, characters or codes and, in this way, constitute negative pieces of information within the color-shifting region 42 and/or the hologram region 40. It is understood that, in a concrete security element, not all types of gaps shown must be provided at the same time.

The security element 50 includes, for one thing, gaps 58 that are present only in the metalization 28, but that have no congruent equivalents in the thin-film element 32. In the region of these gaps 58, which in the exemplary embodiment are developed in the form of the letter string "PL", as shown in FIG. 4, the view of the color-shifting thin-film element 32 through the metalization 28 is enabled such that these regions within the hologram 40 form a negative piece of information having a contrasting color effect.

Further, gaps 52 are provided outside of the hologram region 40 in the metallic reflection layer 34 of the thin-film element 32 in the form of the number string "10". The gaps 52 form, within the color-shifting region 42, transparent or translucent regions that produce a conspicuous contrast effect in transmitted light. The gaps 52 can also extend through the dielectric layer 36 and the absorber layer 38, as shown, for instance, with the gaps 54 of the thin-film element 32.

The gaps 54 of the thin-film element 32 are arranged within the hologram region 40 in register with gaps 56 in the metalization 28, such that see-through regions are created there within the hologram 40. In FIG. 4, the gapped regions 54, 56, just like the gapped regions 52, are developed as negative lettering in the form of the number string "10". The gap 54 of the thin-film element is preferably formed to be somewhat larger than the gap 56 of the metalization to compensate for potential register variations and to ensure that the gap 56 always appears completely bright in transmitted light, also when the gap 54 varies somewhat in its position.

In embodiments having an alternative layer sequence, the thin-film element can also be arranged beneath the partially metalized embossing lacquer layer, as illustrated based on the exemplary embodiment 60 in FIG. 5.

In the security element 60, a thin-film element 62 is applied in some regions on a substrate foil 22 in the layer sequence reflection layer 34, dielectric spacing layer 36 and absorber layer 38. Over the thin-film element 62 is applied an embossing lacquer layer 24 that was embossed in the form of a relief pattern 26 and provided in a desired sub-region 40 with a metalization 28.

The partially metalized embossing lacquer layer 24, 28 was then leveled with a 1.5 μm thick, transparent lacquer layer 30 whose refractive index in the exemplary embodiment differs by less than 0.1 from the refractive index of the embossing lacquer layer 24. When the security element 60 is viewed from a viewing direction 64, only the hologram formed by the relief pattern 26 appears in the metalized sub-regions 40, while in the non-metalized sub-regions 42, the optical effect of the relief pattern 26 is neutralized by the transparent lacquer layer 30, such that, there, only the color-shift effect of the thin-film element 62 appears.

Also in the layer sequence in FIG. 5, the color-shifting regions 42 and the relief pattern regions 40 appear for the viewer to lie next to each other in perfect register and without reciprocal visual influencing. It is understood that also the embodiment in FIG. 5 can be provided with gaps in the metalization 28 and/or the thin-film element 62.

The described embodiments can also be combined with further elements, for example with a semi-transparent ink layer that is applied to the thin-film element in some regions, and/or with a phase-delay layer that forms an additional hidden security feature. In FIG. 6 is shown, by way of example, an embodiment 70 in which, as in FIG. 5, to a substrate foil 22 is first applied a thin-film element 62 in the layer sequence reflection layer 34, dielectric spacing layer 36 and absorber layer 38.

On the thin-film element 62 is imprinted in some regions a semi-transparent ink layer 72, the thin-film element 62 and the semi-transparent ink layer 72 being coordinated with each other in such a way that, when viewed at a vertical viewing angle, they evoke substantially the same color impression. When the security element 70 is tilted, the color impression of the thin-film element 62 changes in the non-covered regions due to the color-shift effect that occurs there, while the color impression in the regions covered by the ink layer 72 does not change or changes only a little.

For example, the thin-film element 62 can be designed such that its color impression changes from magenta when viewed vertically to green when viewed obliquely. Coordinated therewith, the semi-transparent ink layer 72 conveys, when viewed vertically, a likewise magenta-colored color impression that, unlike the color impression of the thin-film element 62, remains substantially unchanged when the security element is tilted. Such a combination of color-variable regions with immediately adjoining color-constant regions further increases the visual conspicuousness of the color-shift effect of the thin-film element 62, since the human eye reacts more strongly to the occurring color differences than to the color change per se.

Over the thin-film element 62 having the imprinted semi-transparent ink layer 72 is applied an embossing lacquer layer 24, embossed in the form of a desired relief pattern 26 and provided in a predetermined sub-region 40 with a metalization 28. The partially metalized embossing lacquer layer 24, 28 is leveled with a 2 μm thick, transparent lacquer layer 30 whose refractive index in the exemplary embodiment differs by less than 0.2 from the refractive index of the embossing lacquer layer 24.

Except for the additional color-constant regions of the ink layer 72, the visual impression of the security element 70, which impression is perceptible without auxiliary means, corresponds to the impression of the security element 60 described for FIG. 5. In the exemplary embodiment in FIG. 6, these openly visible security features are additionally combined with a hidden security feature that is perceptible only with auxiliary means, such as a polarizer laid on it. For this, the security element 70 includes a transparent phase-delay layer 74 that is arranged in some regions, in the form of a pattern, over the thin-film element 62 and the partially metalized embossing lacquer layer 24, 28.

The phase-delay layer 74 consists of a birefringent material, for example a nematic liquid crystal material. The layer thickness of the phase-delay layer 74 is typically chosen such that its phase delay corresponds to an optical path difference between about λ/6 and about λ/2, preferably about λ/4, where λ constitutes a wavelength from the visible spectral range. While the phase-delay layer 74 is practically not perceptible when the security element 70 is viewed with common unpolarized light and without auxiliary means, when viewed with a polarizer laid on it, strong contrast differences stand out between the regions having a phase-delay layer 74 and those without a phase-delay layer. In this way, the presence and the form of the pattern formed by the phase-delay layer can be used for an additional authenticity check, for example at the point of sale or in banks.

The operating principle of the hidden security feature will now be explained briefly using the example of a λ/4 phase-delay layer 74 and, laid on it, a circular polarizer that transmits only right-circularly polarized light. Under these conditions, the circular polarizer lets only the right-circularly polarized portion of incident unpolarized light through. In the security element sub-regions without a phase-delay layer 74, the right-circularly polarized light is reflected by the metallic reflector layer 34 of the thin-film element 62 with the reverse polarization direction, in other words as left-circularly polarized light. The reflected left-circularly polarized light is blocked by the circular polarizer, such that these sub-regions appear dark for the viewer.

In the sub-regions having a phase-delay layer 74, the right-circularly polarized light is, in contrast, transformed into linearly polarized light by the phase-delay layer before the reflection at the reflector layer 34. The light that remains linearly polarized after reflection passes through the phase-delay layer 74 anew and, in the process, is transformed into right-circularly polarized light that can easily pass the circular polarizer under the chosen requirements. In these sub-regions, the pattern of the open security feature thus appears for the viewer substantially unchanged in brightness.

Figure 7:
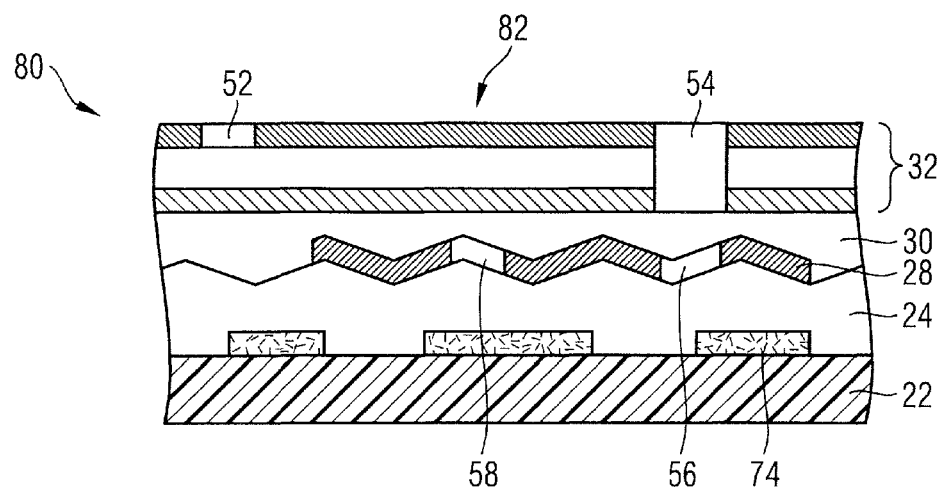

Here, it is also important that the semi-transparent ink layer 72 largely preserves the polarization state of the penetrating light, such that the pattern formed by the phase-delay layer 74 can be made equally visible in the color-variable and the color-constant regions. However, it is understood that the phase-delay layer can also be used in embodiments without a semi-transparent ink layer and that, conversely, a semi-transparent ink layer can also be provided in embodiments without a phase-delay layer. FIG. 7 shows, as a further variant of the present invention, a transfer element 80. The transfer element 80 includes, as a substrate foil, a PET foil 22 that is coated in some regions, in the form of a pattern, with a transparent phase-delay layer 74. To the substrate foil provided with the phase-delay layer 74 is applied, as in the exemplary embodiment in FIG. 3, an embossing lacquer layer 24, which is embossed in the form of a desired relief pattern and provided in a predetermined sub-region with a metalization 28. The partially metalized embossing lacquer layer is leveled with a suitably coordinated, transparent lacquer layer 30, and over the leveled relief pattern is arranged a thin-film element 32 having a color-shift effect. Gaps 52, 54, 56, 58 can be provided in the thin-film element 32 and the metalization 28, as already described above. This variant constitutes a transfer solution in which the shown transfer element 70 is adhered with the function side 82 to a background, and the substrate foil 22 can be removed if needed.

Figure 8:
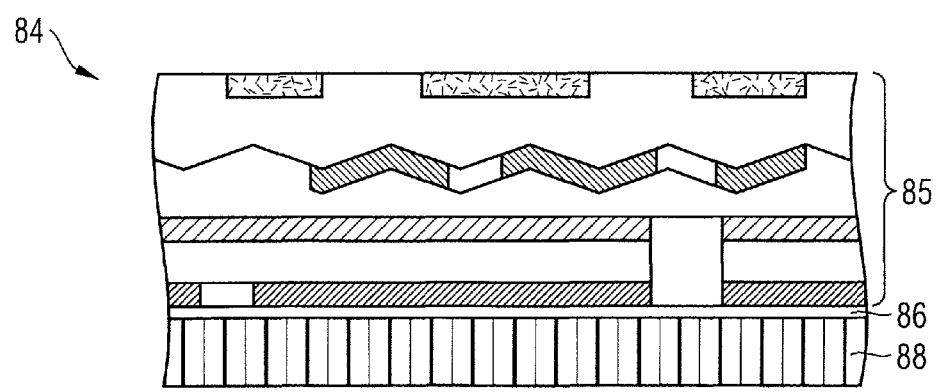

In the exemplary embodiment 84 in FIG. 8, the transfer element 80 in FIG. 7 has been adhered by means of an adhesive layer 86 to a second substrate foil 88, and the substrate foil 22 removed. In this way, a security element 84 having a substrate foil 88 having firmly anchored function layers 85 is obtained that can be adhered to a desired target substrate.

Figure 9:
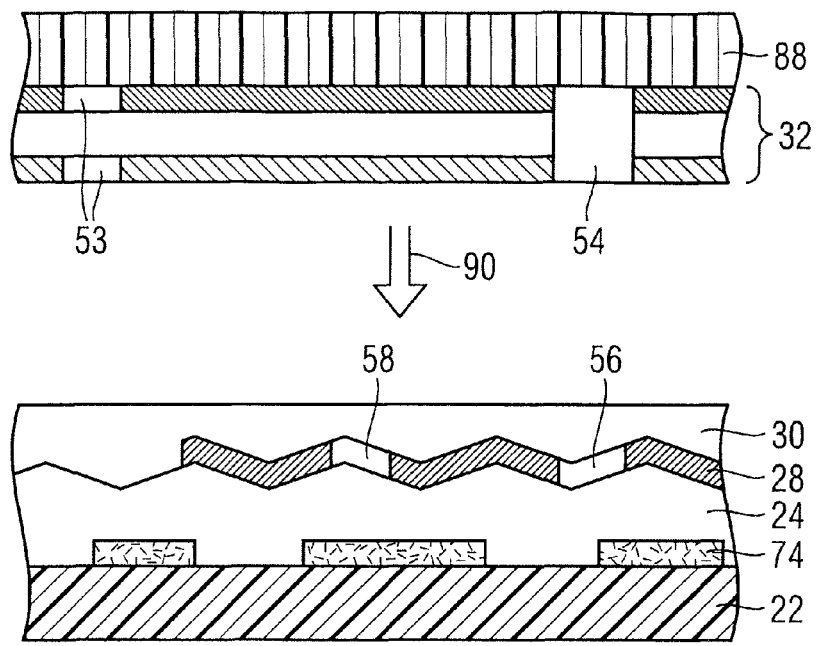

In a further variant of the present invention, which is depicted in FIG. 9, a first substrate foil 22 is coated in some regions, in the form of a pattern, with a transparent phase-delay layer 74, an embossing lacquer layer 24 is applied over that, embossed in the form of a desired relief pattern and provided in a predetermined sub-region with a metalization 28. In the metalization 28 can be provided, in the manner described above, gaps 56, 58. Then the relief pattern is leveled with a transparent lacquer layer 30 whose refractive index substantially corresponds to the refractive index of the embossing lacquer layer 24.

A second substrate foil 88 is partially provided with a thin-film element 32 having a color-shift effect, the gaps in the thin-film element 32, such as the gap 54, being able to penetrate through the entire interference layer. Alternatively, as with the gap 53, also the absorber layer and the reflection layer of the thin-film element 32 can be gapped separately.

Figure 10:
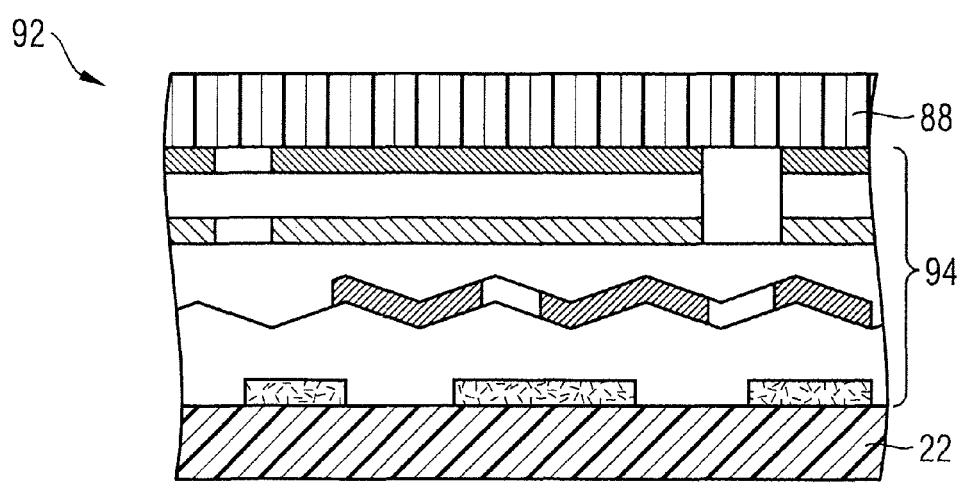

Then, the first substrate foil 22 and the second substrate foil 88 are brought together 90 and bonded, such that the layer composite 92 shown in FIG. 10 is obtained. One of the two substrate foils 22, 88 is removed from this layer composite 92 such that a single substrate foil having the function layers 94 remains, which is subsequently adhered to a desired target substrate. The lacquer layer 30 preferably serves as the adhesive.

In all embodiments, the thin-film elements can also be developed in the form absorber layer/dielectric layer/absorber layer, with also larger layer stacks having the sequence absorber layer 1/dielectric layer 1/absorber layer 2/dielectric layer 2 . . . dielectric layer N−1/absorber layer N, where N=3, 4, 5 . . . , being possible. Also layer sequences such as these exhibit a color-shift effect, but are not opaque, such that the color-shift effect is visible also from the reverse of the security element. Security elements having such thin-film elements can be used especially in documents having see-through regions.

The mentioned gaps in the reflection layers can also be designed like a grid, preferably having a low areal fraction of 40% or less. The gaps in the reflection layers are then practically not noticeable in reflected light, but rather appear only in transmitted light.

The invention claimed is:

1. A security element for securing valuable articles, in which
 a thin-film element having a color-shift effect and a relief pattern present in an embossing lacquer layer are stacked,
 the embossing lacquer layer having the relief pattern is metalized in sub-regions to form a partially metalized embossing lacquer layer having a metallization on the embossing layer, and
 the relief pattern of the partially metalized embossing lacquer layer is leveled with a transparent lacquer layer whose refractive index substantially corresponds to the refractive index of the embossing lacquer layer, characterized in that a color-shift effect of the thin-film element and an optically variable effect of the relief pattern are each visible when viewed from the side of the relief pattern;
 wherein the thin-film element and the relief pattern leveled with the transparent lacquer layer are stacked such that the thin-film element is in direct contact with either (i) the embossing lacquer layer of the relief pattern or (ii) the transparent lacquer layer.

2. The security element according to claim 1, characterized in that the transparent lacquer layer exhibits a layer thickness of more than 800 nm.

3. The security element according to claim 1, characterized in that the difference in the refractive indices of the embossing lacquer layer and the transparent lacquer layer is less than 0.3.

4. The security element according to claim 1, characterized in that the transparent lacquer layer is transparently colored.

5. The security element according to claim 1, characterized in that the transparent lacquer layer is formed to be coilable and tack free.

6. The security element according to claim 1, characterized in that the relief pattern constitutes a diffractive pattern.

7. The security element according to claim 1, characterized in that the thin-film element includes a reflection layer, an absorber layer and a dielectric spacing layer arranged between the reflection layer and the absorber layer.

8. The security element according to claim 7, characterized in that the thin-film element is arranged over the partially metalized embossing lacquer layer and the transparent lacquer layer in the layer sequence absorber layer, dielectric spacing layer and reflection layer.

9. The security element according to claim 7, characterized in that the partially metalized embossing lacquer layer and the transparent lacquer layer are arranged over the thin-film element in the layer sequence reflection layer, dielectric spacing layer and absorber layer.

10. The security element according to claim 1, characterized in that the thin-film element includes at least a first absorber layer, a second absorber layer and a dielectric spacing layer arranged between the two absorber layers.

11. The security element according to claim 1, characterized in that the metalization of the embossing lacquer layer to form a partially metalized embossing lacquer layer having a metallization on the embossing layer is provided with gaps in the form of patterns, characters or codes.

12. The security element according to claim 1, characterized in that the thin-film element exhibits a reflection layer having gaps in the form of patterns, characters or codes that form transparent or translucent regions in the thin-film element.

13. The security element according to claim 12, characterized in that the thin-film element and the metalization of the embossing lacquer layer exhibit congruent gaps.

14. The security element according to claim 1, characterized in that the security element is provided in some regions with a transparent phase-delay layer that forms a phase-shifting layer for light from the visible wavelength range.

15. The security element according to claim 14, characterized in that the phase-delay layer is present in the form of patterns, characters or a code.

16. The security element according to claim 14, characterized in that the phase delay of the phase-delay layer corresponds to an optical path difference between $\lambda/6$ and $\lambda/2$ for light from the visible wavelength range.

17. The security element according to claim 14, characterized in that the phase-delay layer forms, at least in sub-regions, a $\lambda/4$ layer for light from the visible wavelength range.

18. The security element according to claim 14, characterized in that the phase-delay layer is formed from nematic liquid crystal material.

19. The security element according to claim 1, characterized in that, in some regions, a semi-transparent ink layer is arranged over the thin-film element, the color impression of the thin-film element being coordinated with the color impression of at least a sub-region of the semi-transparent ink layer when viewed under predetermined viewing conditions.

20. The security element according to claim 19, characterized in that, in a spectral range in which the color impression of the thin-film element is coordinated with the color impression of the semi-transparent layer, the semi-transparent ink layer exhibits a transmittance between 30% and 95%, preferably between 60% and 95%, and particularly preferably between 80% and 95%.

21. The security element according to claim 19, characterized in that the semi-transparent ink layer is present in the form of characters, patterns or codes.

22. The security element according to claim 19, characterized in that the semi-transparent ink layer substantially preserves the polarization state of light from the visible wavelength range passing through.

23. The security element according to claim 19, characterized in that the semi-transparent ink layer exhibits multiple sub-regions having a different color impression, and the color impression of the thin-film element when viewed under predetermined viewing conditions is coordinated with the color impression of at least one of the sub-regions.

24. The security element according to claim 1, characterized in that the difference in the refractive indices of the embossing lacquer layer and the transparent lacquer layer is less than 0.1.

25. The security element according to claim 1, characterized in that the relief pattern constitutes a hologram, a holographic grating image, a hologram-like diffraction pattern, a matte pattern, a micromirror arrangement, a blazed lattice having a sawtooth-like groove profile or a Fresnel lens arrangement.

26. The security element of claim 1, wherein the thin-film element and the relief pattern leveled with the transparent lacquer layer are stacked such that the thin-film element is in direct contact with the transparent lacquer layer.

27. A method for manufacturing a security element comprising the security element of claim 1, in which
a thin-film element having a color-shift effect and a relief pattern present in an embossing lacquer layer are stacked on a substrate,
the embossing lacquer layer having the relief pattern is metalized in sub-regions to form a partially metalized embossing layer having a metallization on the embossing layer, and
the relief pattern of the partially metalized embossing lacquer layer is leveled with a transparent lacquer layer whose refractive index substantially corresponds to the refractive index of the embossing lacquer layer.

28. The method according to claim 27, characterized in that the transparent lacquer layer is imprinted in a layer thickness of more than 800 nm.

29. The method according to claim 27, characterized in that, first, a thin-film element is applied to the substrate in the layer sequence reflection layer, dielectric spacing layer and absorber layer, the embossing lacquer layer is applied over the thin-film element, embossed and partially metalized, and the partially metalized embossing lacquer layer is then leveled with the transparent lacquer layer.

30. The method according to claim 27, characterized in that, first, the embossing lacquer layer is applied to the substrate, embossed and partially metalized, the partially metalized embossing lacquer layer is leveled with the transparent lacquer layer and a thin-film element is then applied to the transparent lacquer layer in the layer sequence absorber layer, dielectric spacing layer and reflection layer.

31. The method according to claim 27, characterized in that the thin-film element having a color-shift effect is applied to a first substrate foil, the embossing lacquer layer is applied to a second substrate foil, embossed and partially metalized, and the thin-film element and the partially metalized embossing lacquer layer are then joined by means of an adhesive layer.

32. The method according to claim 27, characterized in that, in some regions, a semi-transparent ink layer is arranged over the thin-film element, the color impression of the thin-film element being coordinated with the color impression of at least a sub-region of the semi-transparent ink layer when viewed under predetermined viewing conditions.

33. The method according to claim 32, characterized in that the semi-transparent ink layer is imprinted, especially in the screen printing, intaglio printing or flexographic printing process.

34. The method according to claim 27, characterized in that the security element is provided with a transparent phase-delay layer that forms a phase-shifting layer for light from the visible wavelength range.

35. A security paper for manufacturing security or value documents that are furnished with the security element according to claim 1.

36. The security paper according to claim 35, characterized in that the security paper comprises a carrier substrate composed of paper or plastic.

37. A data carrier, especially a branded article, value document or the like, having the security element according to claim 1.

* * * * *